United States Patent
Pietraski et al.

(10) Patent No.: US 7,215,646 B2
(45) Date of Patent: May 8, 2007

(54) METHOD AND APPARATUS FOR ESTIMATING AND REPORTING THE QUALITY OF A WIRELESS COMMUNICATION CHANNEL

(75) Inventors: Philip J. Pietraski, Huntington Station, NY (US); Gregory S. Sternberg, Great Neck, NY (US); Rui Yang, Greenlawn, NY (US); Bin Li, Ronkonkoma, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 10/940,079

(22) Filed: Sep. 14, 2004

(65) Prior Publication Data

US 2005/0094596 A1 May 5, 2005

Related U.S. Application Data

(60) Provisional application No. 60/517,696, filed on Nov. 5, 2003.

(51) Int. Cl.
- *G01R 31/08* (2006.01)
- *G06F 11/00* (2006.01)
- *H04J 1/16* (2006.01)
- *H04L 12/26* (2006.01)
- *H04L 27/06* (2006.01)
- *H03D 1/00* (2006.01)
- *H03D 1/04* (2006.01)

(52) U.S. Cl. .................. 370/252; 375/340; 375/346
(58) Field of Classification Search ................ 370/241, 370/252, 328; 375/224, 340, 346
See application file for complete search history.

(56) References Cited

U.S. PATENT DOCUMENTS

2002/0176482 A1    11/2002    Chien (Continued)

FOREIGN PATENT DOCUMENTS

| EP | 1195921 | 4/2002 |
|---|---|---|
| EP | 1248387 | 10/2002 |
| WO | 01 89097 | 11/2001 |

OTHER PUBLICATIONS

Usuda et al., "Optimizing the Number of Dedicated Pilot Symbols for Forward Link in W-CDMA Systems." 2000 IEEE 51st Vehicular Technology Conference Proceedings, Tokyo, Japan. May 15-18, 2000, pp. 2118-2122.

(Continued)

*Primary Examiner*—Kevin C. Harper
(74) *Attorney, Agent, or Firm*—Volpe and Koenig, P.C.

(57) ABSTRACT

A method and apparatus for estimating and reporting the quality of a wireless communication channel between a wireless transmit/receive unit (WTRU) and a Node-B. A modulated signal is received from the Node-B over the communication channel and a channel estimation is performed on the modulated signal to provide a channel estimate. In one embodiment, the modulated signal is demodulated based on the channel estimate to provide a demodulated signal and a signal-to-interference (SIR) estimate based on the demodulated signal is obtained. The quality of the communication channel is estimated based on at least the SIR estimate. In an alternate embodiment, a SIR estimate based on the channel estimate is obtained. The quality of the communication channel is estimated based on the SIR estimate and additional information including at least one of delay spread, transmit power and WTRU velocity information.

20 Claims, 3 Drawing Sheets

U.S. PATENT DOCUMENTS

| | | |
|---|---|---|
| 2003/0039324 A1 | 2/2003 | Kajita et al. |
| 2003/0092461 A1 | 5/2003 | Moulsey et al. |
| 2003/0114179 A1* | 6/2003 | Smolyar et al. ............ 455/522 |
| 2003/0165157 A1* | 9/2003 | Pollmann et al. ........... 370/465 |
| 2003/0171118 A1 | 9/2003 | Miya |
| 2005/0002468 A1* | 1/2005 | Walton et al. .............. 375/267 |
| 2005/0041622 A1* | 2/2005 | Dubuc et al. ............... 370/332 |

OTHER PUBLICATIONS

Yoon et al., "Adaptive SIR Estimation in WCDMA Systems." IEEE 55th Vehicular Technology Conference Proceedings, Birmingham, AL, May 6-9, 2002, pp. 275-279.

* cited by examiner

METHOD AND APPARATUS FOR ESTIMATING AND REPORTING THE QUALITY OF A WIRELESS COMMUNICATION CHANNEL

CROSS REFERENCE TO RELATED APPLICATION

This application claims priority from U.S. Provisional Patent Application Ser. No. 60/517,696, filed Nov. 5, 2003, which is incorporated by reference as if fully set forth herein.

FIELD OF THE INVENTION

The present invention is related to a wireless communication system including a wireless transmit/receive unit (WTRU) (i.e., user equipment (UE)) and a Node-B (i.e., base station). More particularly, the present invention is related to the WTRU determining the quality of a wireless communication channel and reporting the channel quality to the Node-B.

BACKGROUND

Many existing wireless communication systems employ link adaptation to provide a suitable downlink from a Node-B to a WTRU. The WTRU measures channel quality based on a signal-to-interference (SIR) measurement, and then reports this measurement to the Node-B, enabling the Node-B to employ one or more optimized transmission parameters for communicating with the WTRU. These transmission parameters illustratively include the maximum data rate, minimum power, modulation type, or highest code rate that the WTRU can currently decode, given existing channel conditions. In some wireless systems, such as frequency division duplex (FDD) high speed downlink packet access (HSDPA) systems, these SIR measurements may be performed using a pilot transmission. Typically, such SIR measurements are conducted during channel estimation and subsequently utilized to estimate channel quality.

When a SIR measurement is conducted prior to demodulation, the performance of a demodulator in the receiver of the WTRU is not explicitly captured. Examples of such situations include SIR measurements that are provided by, or derived from, a channel estimation procedure. The underlying logic for basing SIR measurements on channel estimation is that a high quality channel should correspond to a high quality of reception. Unfortunately, this logic does not always hold true, especially when the quality of the receiver algorithm varies substantially.

A reception quality estimation procedure that accurately reflects receiver performance is desired, such that a better performing receiver will report better reception quality than a poorly performing receiver. Thus, more aggressive transmission parameters may be utilized in conjunction with the better performing receiver.

SUMMARY

The present invention is related to a method and apparatus for estimating and reporting the quality of a wireless communication channel between a wireless transmit/receive unit (WTRU) and a Node-B. The apparatus may be a wireless communication system, a WTRU and/or an integrated circuit (IC). A modulated downlink signal is received from the Node-B via the wireless communication channel. The modulated signal includes a modulated data and pilot sequence, combined with noise. A channel estimation is performed on the modulated signal to obtain a channel estimate.

In a preferred embodiment, the modulated signal is demodulated based on the channel estimate to provide a demodulated signal. A SIR estimation is performed on the demodulated signal to obtain a SIR estimate. The quality of the wireless communication channel is estimated based on at least the SIR estimate. The quality of the wireless communication channel may be further based on additional information including at least one of delay spread, transmit power and WTRU velocity. An uplink signal indicating the quality of quality of the wireless communication channel is sent from the WTRU to the Node-B.

In an alternate embodiment, a SIR estimation is performed on the channel estimate to obtain a SIR estimate. The quality of the wireless communication channel is estimated based on the SIR estimate and additional information including at least one of delay spread, transmit power and WTRU velocity information.

BRIEF DESCRIPTION OF THE DRAWING

A more detailed understanding of the invention may be had from the following description of a preferred example, given by way of example and to be understood in conjunction with the accompanying drawing wherein.

DETAILED DESCRIPTION OF THE PREFERRED EMBODIMENT

Hereafter, the terminology "WTRU" includes but is not limited to a UE, mobile station, fixed or mobile subscriber unit, pager, or any other type of device capable of operating in a wireless environment.

When referred to hereafter, the terminology "Node-B" includes but is not limited to a base station, site controller, access point or any other type of interfacing device in a wireless environment.

The present invention may be further applicable to time division duplex (TDD), FDD, and time division synchronous code division multiple access (TD-SCDMA), as applied to universal mobile telecommunications system (UMTS), CDMA 2000 and CDMA in general, but is envisaged to be applicable to other wireless systems as well.

The features of the present invention may be incorporated into an IC or be configured in a circuit comprising a multitude of interconnecting components.

Figure 1:
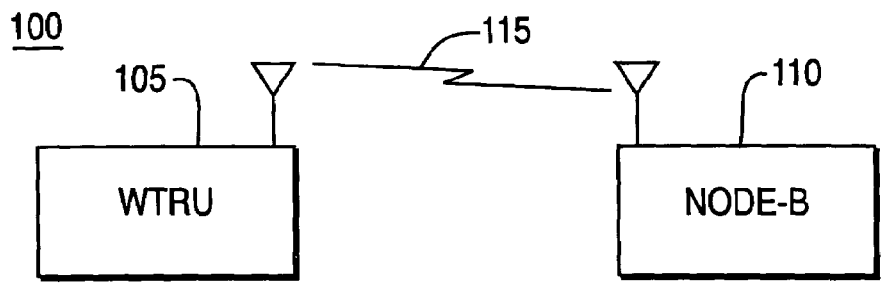
FIG. 1 shows a wireless communication system including a Node-B and a WTRU with a receiver incorporated therein in accordance with the present invention.

FIG. 1 shows a wireless communication system 100 operating in accordance with the present invention. The system 100 includes a WTRU 105 and a Node-B 110 which communicate with each other via wireless signals 115.

Figure 2:
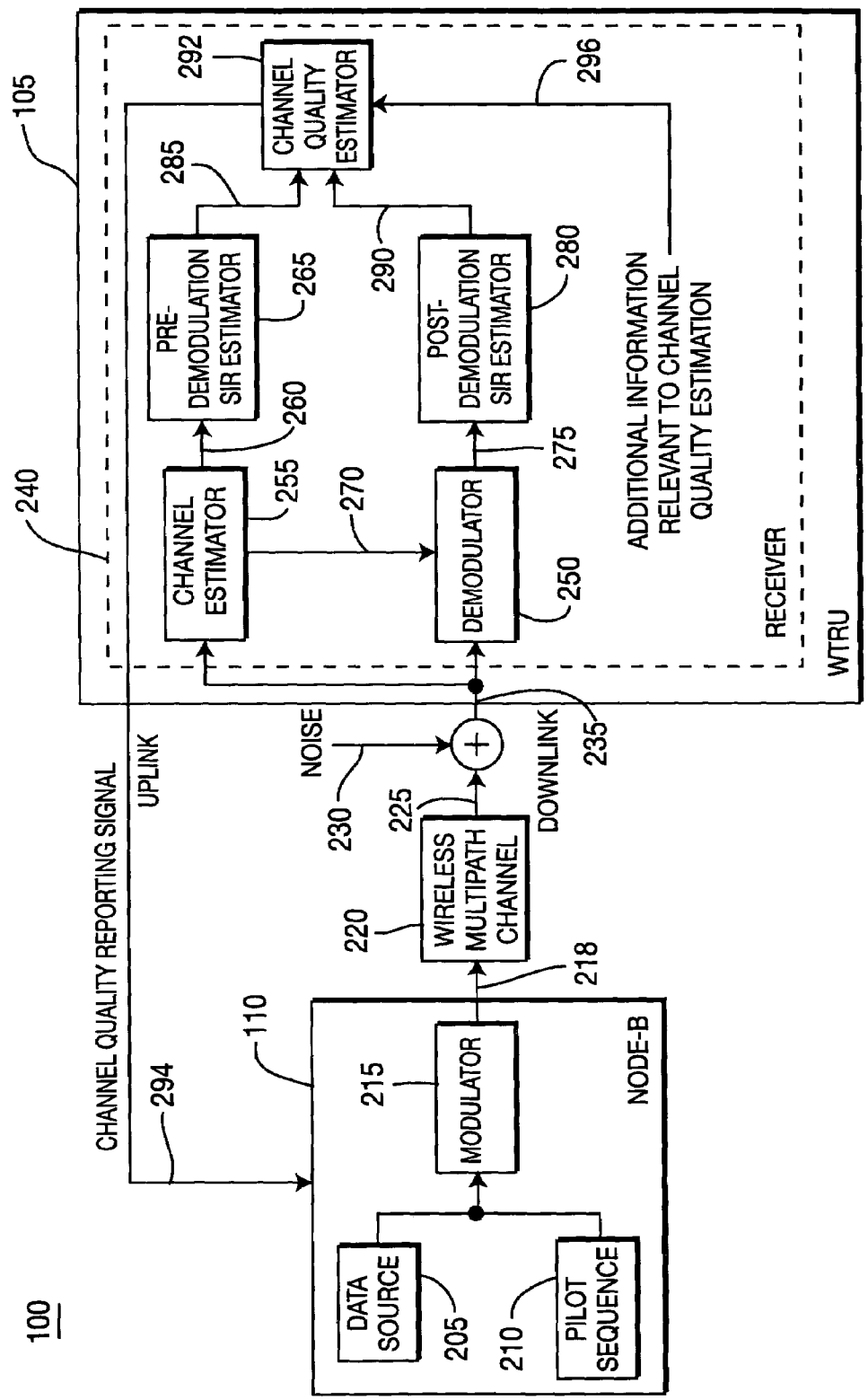
FIG. 2 is a detailed block diagram of the Node-B and the WTRU's receiver of FIG. 1.

FIG. 2 is a detailed block diagram of the wireless communication system 100 of FIG. 1. As shown in FIG. 2, the WTRU 105 includes a receiver 240 that that processes a pilot channel as a data carrying channel, thus enabling the utilization of one or more optimized transmission parameters. The receiver 240 recovers a plurality of soft symbols from the pilot channel, and uses these soft symbols to compute a SIR estimate. Since the characteristics of the pilot transmission are known, a transmit data aided (TXDA) SIR estimate captures the performance of the receiver 240, and optionally provides a basis for formulating an accurate channel quality estimate.

Information gathered from comparing a post-detection SIR estimate with a channel-estimate-based (i.e., pre-detection) SIR estimate may be utilized for WTRU power management purposes. For example, the gathered information may be used to trigger the temporary disablement of one or more components within the WTRU's receiver to significantly reduce power consumption in the WTRU 105 when channel conditions permit.

Still referring to FIG. 2, the receiver 240 includes a demodulator 250, a channel estimator 255, a pre-demodulation SIR estimator 265, a post-demodulation SIR estimator 280 and a channel quality estimator 292. The receiver 240 estimates the quality of a channel in accordance with a preferred embodiment of the present invention. At the Node-B 110, a data source 205 and a pilot sequence 210 are inputted to a modulator 215. A modulated data and pilot sequence 218 is transmitted over a wireless multipath channel 220 to the WTRU 105 as a modulated signal 225. Practical communication channels virtually always add some noise 230 to the modulated signal 225 to produce a modulated downlink signal 235.

As shown in FIG. 2, the demodulator 250 and the channel estimator 255 in the receiver 240 of the WTRU 105 receive the modulated downlink signal 235. The demodulator 250 attempts to reconstruct the signal going into the modulator 215 and outputs a demodulated signal 275. The channel estimator 255 attempts to determine the current behavior, (i.e., transfer function or impulse response), of the wireless multipath channel 220 and outputs channel estimates 260 and 270. The demodulator 250 obtains a demodulated signal 275 based on the channel estimate 270. The post-demodulation SIR estimator 280 performs a SIR estimation on the demodulated signal 275 to obtain a SIR estimate 290.

The demodulated signal 275 is the estimation of the signals going into the modulator 215 in the Node-B 110. The pilot portion of the demodulated signal 275 is used by the post-demodulation SIR estimator 280 to obtain a pilot-based SIR estimate 290. The known pilot symbols in the pilot sequence 210 are compared to estimated pilot symbols in the demodulated signal 275 to obtain the SIR estimate 290, thereby being indicative of the performance of the demodulator 250.

The channel quality estimator 292 estimates the quality of the wireless multipath channel 220 based on at least the SIR estimate 290. The channel quality estimator 292 maps at least the SIR estimate 290 into a channel quality indicator (CQI) and sends a channel quality reporting uplink signal 294 including the CQI to provide feedback indicative of channel quality and/or reception quality to the Node-B 110 via an uplink multipath channel.

In accordance with an alternate embodiment, the pre-demodulation SIR estimator 265 performs a SIR estimation on the channel estimate 260 to obtain a SIR estimate 285. The channel quality estimator 292 maps the SIR estimate 285 and additional information 296 including at least one of delay spread, transmit power and WTRU velocity information into a CQI, and sends a channel quality reporting uplink signal 294 including the CQI to provide feedback indicative of channel quality and/or reception quality to the Node-B 110 via an uplink multipath channel. Delay spread is a measure of the support of the typical multipath channel impulse response. There are multiple measures of this quantity, e.g., rms delay spread. Changes in transmit power will clearly influence the SIR measurements and thus may be useful in mapping SIR into CQI if known apriori. WTRU velocity determines how fast the channel, and therefore the channel quality, changes. Since there is some delay in reporting and using the CQI, performance can be improved by modifying the CQI based on the WTRU velocity.

In yet another embodiment, the channel quality estimator 292 may map the SIR estimate 285, the SIR estimate 290 and the additional information 296 into a CQI.

When one or more characteristics of the channel, such as delay spread, transmit power, and WTRU velocity, are employed to estimate the CQI in the WTRU 105, such characteristics provide an indirect method of accounting for the performance of the demodulator 250. Accordingly, reliance upon these additional characteristics may generate channel quality estimates that are less accurate than the method described above, but it may prove useful in certain system applications.

Figure 3:
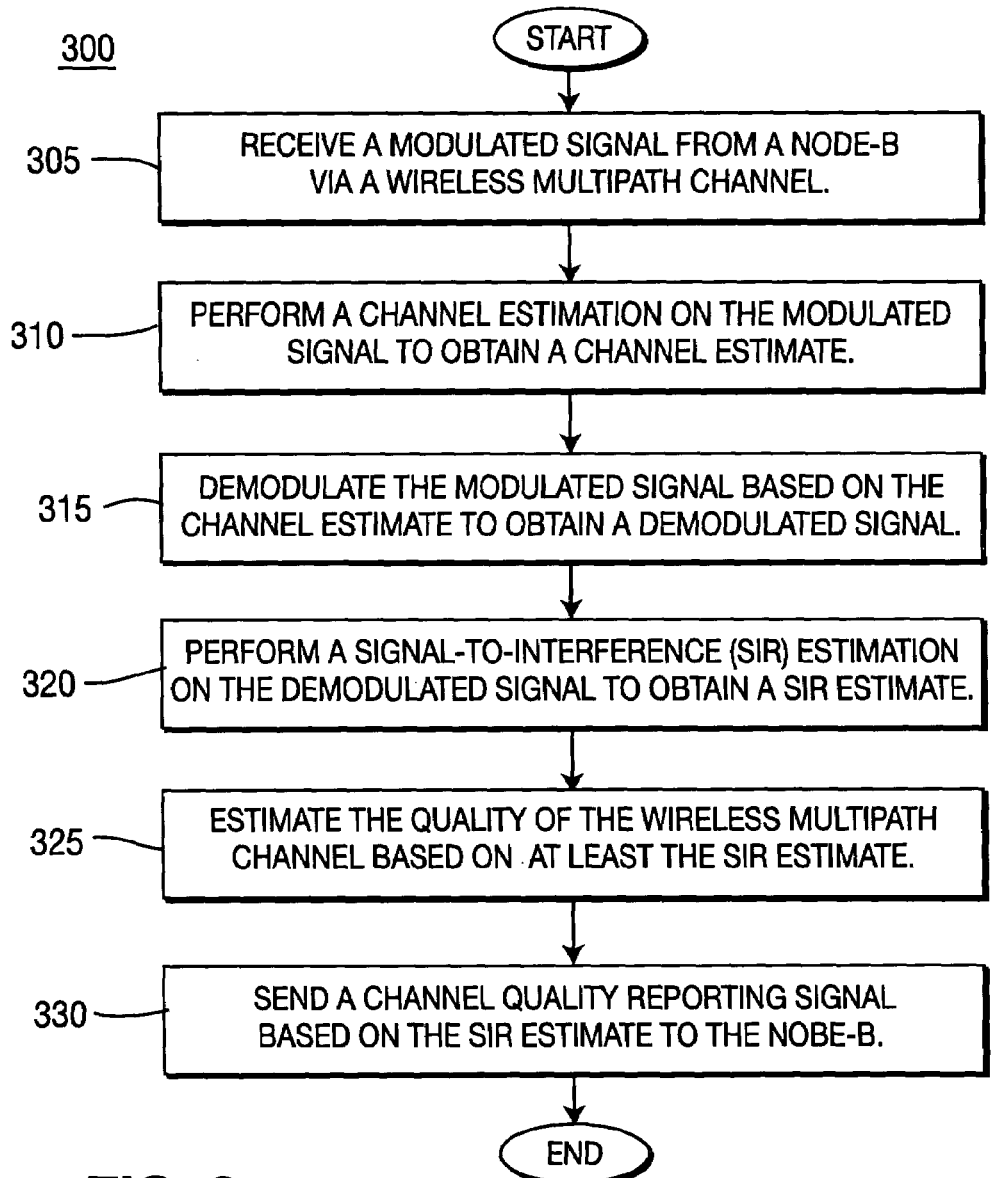
FIG. 3 is a flow chart of a process including method steps for estimating the quality of a wireless communication channel in accordance with a preferred embodiment of the present invention.

FIG. 3 is a flow chart of a process 300 including method steps for estimating the quality of a wireless multipath channel in accordance with a preferred embodiment of the present invention. Referring to FIGS. 2 and 3, in step 305, a modulated downlink signal 235 is received from the Node-B 110 via a wireless multipath channel 220. In step 310, a channel estimation is performed on the modulated downlink signal 235 to obtain a channel estimate 270. In step 315, the modulated downlink signal 235 is demodulated based on the channel estimate 270 to obtain a demodulated signal 275. In step 320, a SIR estimation is performed on the demodulated signal 275 to obtain a SIR estimate 290. In step 325, the quality of the wireless multipath channel 220 is estimated based on at least the SIR estimate 290. In step 330, the WTRU 105 sends an uplink channel quality reporting uplink signal 294 based on the SIR estimate 290 to the Node-B 110.

Figure 4:
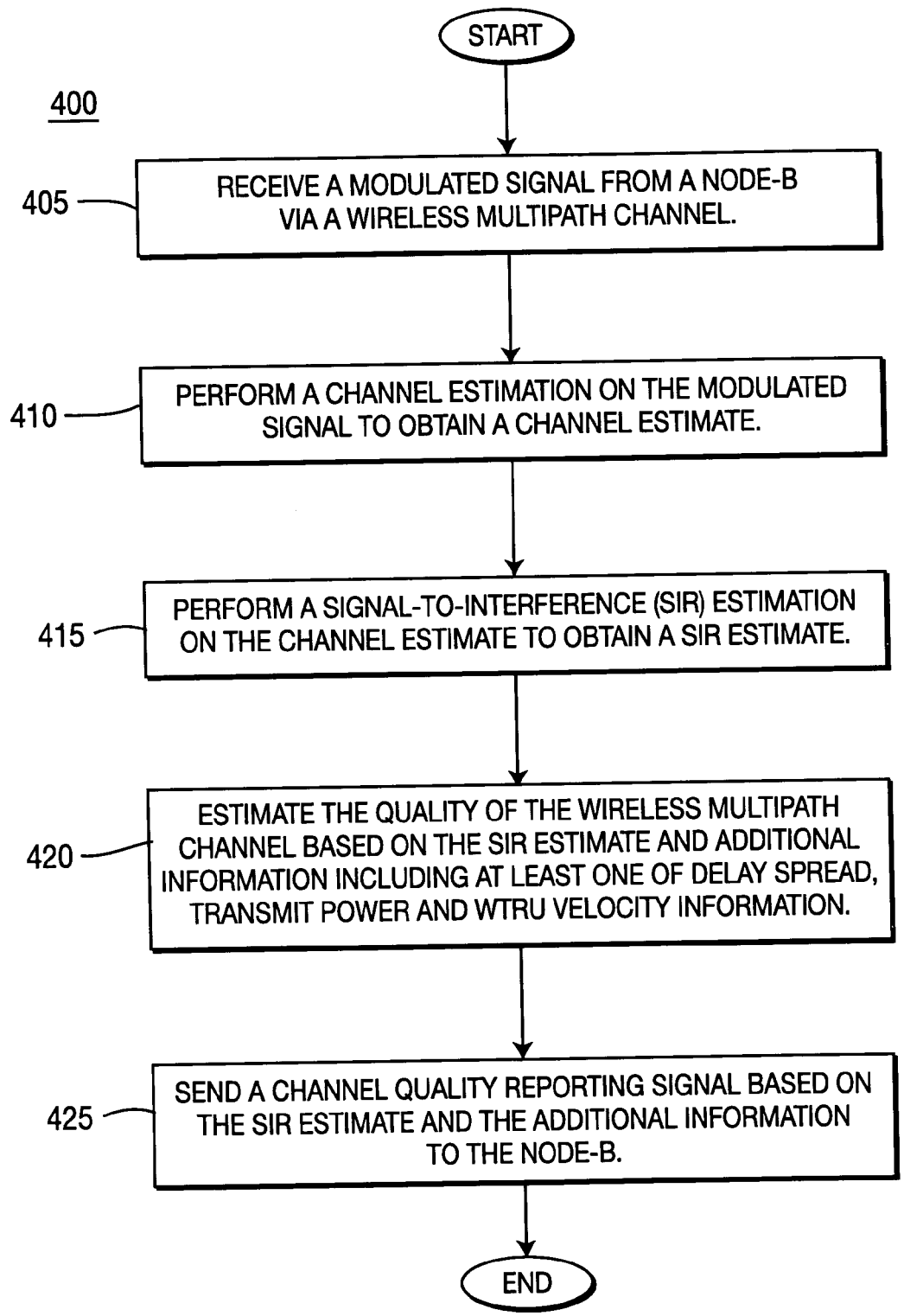
FIG. 4 is a flow chart of a process including method steps for estimating the quality of a wireless communication channel in accordance with an alternate embodiment of the present invention.

FIG. 4 is a flow chart of a process 400 including method steps for estimating the quality of a wireless multipath channel in accordance with an alternate embodiment of the present invention. Referring to FIGS. 2 and 4, in step 405, a modulated downlink signal 235 is received from the Node-B 110 via a wireless multipath channel 220. In step 410, a channel estimation is performed on the modulated downlink signal 235 to obtain a channel estimate 260. In step 415, a SIR estimation is performed on the channel estimate 260 to obtain a SIR estimate 285. In step 420, the quality of the wireless multipath channel 220 is estimated based on the SIR estimate 285 and additional information 296. The additional information 296 includes at least one of delay spread, transmit power and WTRU velocity information. In step 425, the WTRU 105 sends an uplink channel quality reporting uplink signal 294 based on the SIR estimate 285 and the additional information 296 to the Node-B 110.

While this invention has been particularly shown and described with reference to preferred embodiments, it will be understood by those skilled in the art that various changes in form and details may be made therein without departing from the scope of the invention described hereinabove.

What is claimed is:

1. In a wireless communication system including at least one wireless transmit/receive unit (WTRU), and at least one Node-B, the Node-B communicating with the WTRU via a wireless communication channel, a method of estimating the quality of the wireless communication channel comprising:
    (a) the WTRU receiving a modulated signal from the Node-B via the wireless communication channel;
    (b) a channel estimator in the WTRU performing a channel estimation on the modulated signal to obtain a channel estimate;
    (c) a pre-demodulation signal-to-interference (SIR) estimator in the WTRU performing a SIR estimation on a channel estimate output by the channel estimator to obtain a pre-demodulation SIR estimate;
    (d) a demodulator in the WTRU demodulating the modulated signal based on a channel estimate output by the channel estimator to obtain a demodulated signal;
    (e) a post-demodulation SIR estimator in the WTRU performing a SIR estimation on a demodulated signal output by the demodulator to obtain a post-demodulation SIR estimate;
    (f) a channel quality estimator in the WTRU receiving the pre-demodulation SIR estimate from the pre-demodulation SIR estimator;
    (g) the channel quality estimator receiving the post-demodulation SIR estimate from the post-demodulation SIR estimator; and
    (h) the channel quality estimator estimating the quality of the wireless communication channel based on the pre-demodulation SIR estimate, the post-demodulation SIR estimate and additional information including at least one of delay spread, transmit power and WTRU velocity information.

2. The method of claim 1 further comprising:
    (i) the channel quality estimator mapping the pre-demodulation SIR estimate, the post-demodulation SIR estimate and the additional information into a channel quality indicator (CQI).

3. The method of claim 1 wherein the modulated signal includes a modulated data and pilot sequence, combined with noise.

4. The method of claim 1 further comprising:
    (i) the WTRU sending a feedback signal to the Node-B based on the pre-demodulation SIR estimate, the post-demodulation SIR estimate and the additional information, the feedback signal being indicative of channel quality and/or reception quality with respect to the wireless communication channel.

5. The method of claim 1 wherein the WTRU recovers a plurality of soft symbols or bits from the modulated signal used to obtain the pre-demodulation SIR estimate.

6. A wireless communication system for estimating the quality of a wireless communication channel, the system comprising:
    (a) at least one wireless transmit/receive unit (WTRU); and
    (b) at least one Node-B, wherein:
        (i) the Node-B generates a modulated signal by modulating data and a pilot sequence;
        (ii) the WTRU receives the modulated signal from the Node-B via the wireless communication channel;
        (iii) a channel estimator in the WTRU performs a channel estimation on the modulated signal to obtain a channel estimate;
        (iv) a pre-demodulation signal-to-interference (SIR) estimator in the WTRU performs a (SIR) estimation on a channel estimate output by the channel estimator to obtain a pre-demodulation SIR estimate;
        (v) a demodulator in the WTRU demodulates the modulated signal based on a channel estimate output by the channel estimator to obtain a demodulated signal;
        (vi) a post-demodulation SIR estimator in the WTRU performs a SIR estimation on a demodulated signal output by the demodulator to obtain a post-demodulation SIR estimate; and
        (vii) a channel Quality estimator in the WTRU receives the pre-demodulation SIR estimate from the pre-demodulation SIR estimator, receives the post-demodulation SIR estimate from the post-demodulation SIR estimator, and estimates the quality of the wireless communication channel based on the pre-demodulation SIR estimate, the post-demodulation SIR estimate and additional information including at least one of delay spread, transmit power and WTRU velocity information.

7. The system of claim 6 wherein the WTRU maps the pre-demodulation SIR estimate, the post-demodulation SIR estimate and the additional information into a channel quality indicator (CQI).

8. The system of claim 6 wherein the modulated signal includes a modulated data and pilot sequence, combined with noise.

9. The system of claim 6 wherein the WTRU sends a feedback signal to the Node-B based on the pre-demodulation SIR estimate, the post-demodulation SIR estimate and the additional information, the feedback signal being indicative of channel quality and/or reception quality with respect to the wireless communication channel.

10. The system of claim 6 wherein the WTRU recovers a plurality of soft symbols or bits from the modulated signal used to obtain the pre-demodulation SIR estimate.

11. A wireless transmit/receive unit (WTRU) for estimating the quality of a wireless communication channel, the WTRU comprising:
    (a) a channel estimator for receiving a modulated signal from the wireless communication channel and performing a channel estimation on the modulated signal to obtain a channel estimate;
    (b) a pre-demodulation signal-to-interference (SIR) estimator for performing a pre-demodulation SIR estimation on a channel estimate output by the channel estimator to obtain a pre-demodulation SIR estimate;
    (c) a demodulator for demodulating the modulated signal based on a channel estimate output by the channel estimator to obtain a demodulated signal;
    (d) a post-demodulation SIR estimator for performing a SIR estimation on a demodulated signal output by the demodulator to obtain a post-demodulation SIR estimate; and
    (e) a channel quality estimator for receiving the pre-demodulation SIR estimate from the pre-demodulation SIR estimator, receiving the post-demodulation SIR estimate from the post-demodulation SIR estimator, and estimating the quality of the wireless communication channel based on the pre-demodulation SIR estimate, the post-demodulation SIR estimate and additional information including at least one of delay spread, transmit power and WTRU velocity information.

12. The WTRU of claim 11 wherein the channel quality estimator maps the pre-demodulation SIR estimate, the post-demodulation SIR estimate and the additional information into a channel quality indicator (CQI).

13. The WTRU of claim 11 wherein the modulated signal includes a modulated data and pilot sequence, combined with noise.

14. The WTRU of claim 11 wherein the channel quality estimator transmits a feedback signal based on the pre-demodulation SIR estimate, the post-demodulation SIR estimate and the additional information, the feedback signal being indicative of channel quality and/or reception quality with respect to the wireless communication channel.

15. The WTRU of claim 11 wherein the demodulator recovers a plurality of soft symbols or bits from the modulated signal used to obtain the pre-demodulation SIR estimate.

16. An integrated circuit (IC) for estimating the quality of a wireless communication channel, the IC comprising:
   (a) a channel estimator for receiving a modulated signal from the wireless communication channel and performing a channel estimation on the modulated signal to obtain a channel estimate;
   (b) a pre-demodulation signal-to-interference (SIR) estimator for performing a pre-demodulation SIR estimation on a channel estimate output by the channel estimator to obtain a pre-demodulation SIR estimate;
   (c) a demodulator for demodulating the modulated signal based on a channel estimate output by the channel estimator to obtain a demodulated signal;
   (d) a post-demodulation SIR estimator for performing a SIR estimation on the a demodulated signal output by the demodulator to obtain a post-demodulation SIR estimate; and
   (e) a channel quality estimator for receiving the pre-demodulation SIR estimate from the pre-demodulation SIR estimator, receiving the post-demodulation SIR estimate from the post-demodulation SIR estimator, and estimating the quality of the wireless communication channel based on the pre-demodulation SIR estimate, the post-demodulation SIR estimate and additional information including at least one of delay spread, transmit power and mobile station velocity information.

17. The IC of claim 16 wherein the channel quality estimator maps the pre-demodulation SIR estimate, the post-demodulation SIR estimate and the additional information into a channel quality indicator (CQI).

18. The IC of claim 16 wherein the modulated signal includes a modulated data and pilot sequence, combined with noise.

19. The IC of claim 16 wherein the channel quality estimator transmits a feedback signal based on the pre-demodulation SIR estimate, the post-demodulation SIR estimate and the additional information, the feedback signal being indicative of channel quality and/or reception quality with respect to the wireless communication channel.

20. The IC of claim 16 wherein the demodulator recovers a plurality of soft symbols or bits from the modulated signal used to obtain the pre-demodulation SIR estimate.

* * * * *

UNITED STATES PATENT AND TRADEMARK OFFICE
CERTIFICATE OF CORRECTION

PATENT NO. : 7,215,646 B2 Page 1 of 1
APPLICATION NO. : 10/940079
DATED : May 8, 2007
INVENTOR(S) : Pietraski et al.

It is certified that error appears in the above-identified patent and that said Letters Patent is hereby corrected as shown below:

IN THE SPECIFICATION

Column 2, line 14, before the words "the wireless", delete "quality of".

Column 2, line 23, after the words "OF THE", delete "DRAWING", and insert therefor --DRAWING(S)--.

Column 2, line 28, after the word "accompanying", delete "drawing" and insert therefor --drawings--.

Column 3, line 3, after "240", delete "that".

IN THE CLAIMS

Claim 16, column 7, line 27, after the words "estimation on", delete "the".

Signed and Sealed this

Fourth Day of December, 2007

JON W. DUDAS
*Director of the United States Patent and Trademark Office*